United States Patent
Jiang et al.

(10) Patent No.: US 8,208,406 B1
(45) Date of Patent: Jun. 26, 2012

(54) PACKET FORWARDING USING FEEDBACK CONTROLLED WEIGHTED QUEUES DYNAMICALLY ADJUSTED BASED ON PROCESSOR UTILIZATION

(75) Inventors: Dongyi Jiang, Milpitas, CA (US); Chih-Wei Chao, Saratoga, CA (US); David Yu, San Jose, CA (US); Jin Shang, Newark, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1092 days.

(21) Appl. No.: 12/111,996

(22) Filed: Apr. 30, 2008

Related U.S. Application Data (60) Provisional application No. 61/039,135, filed on Mar. 25, 2008.

(51) Int. Cl.
*H04L 12/28* (2006.01)
(52) U.S. Cl. .................................. 370/255; 370/418
(58) Field of Classification Search .................. 370/254, 370/255, 412–418
See application file for complete search history.

(56) References Cited

U.S. PATENT DOCUMENTS

| | | | |
|---|---|---|---|
| 6,317,416 B1 * | 11/2001 | Giroux et al. | 370/232 |
| 7,110,359 B1 * | 9/2006 | Acharya | 370/235 |
| 7,330,433 B2 * | 2/2008 | Shao et al. | 370/235 |
| 7,894,343 B2 * | 2/2011 | Chao et al. | 370/235 |
| 2003/0219026 A1 * | 11/2003 | Sun et al. | 370/412 |
| 2010/0091783 A1 * | 4/2010 | Venables | 370/412 |

* cited by examiner

*Primary Examiner* — Hong Cho
(74) *Attorney, Agent, or Firm* — Shumaker & Sieffert, P.A.

(57) ABSTRACT

In general, techniques are described for dynamically managing weighted queues. In accordance with the techniques, a network security device comprises a queue management module that assigns, for each queue of a plurality of queues, a quota desirable to a user that a processor of the network security device consumes to service each queue. The queue management module determines, based on the desirable quotas, a queue weight for each queue and computes. Based on the computation, the queue management module dynamically adjusts one or more of the weights such that subsequent amounts of processing time actually required to process the number of packets defined by each of the queue weights more accurately reflects the desirable quotas assigned to each of the queues. The network device outputs the number of packets in accordance with the adjusted weights.

29 Claims, 7 Drawing Sheets

PACKET FORWARDING USING FEEDBACK CONTROLLED WEIGHTED QUEUES DYNAMICALLY ADJUSTED BASED ON PROCESSOR UTILIZATION

This application claims the benefit of U.S. Provisional Application No. 61/039,135, filed Mar. 25, 2008, the entire content of which is incorporated herein by reference.

TECHNICAL FIELD

The invention relates to computer network and, more particularly, to queuing packets within network devices of computer networks.

BACKGROUND

Due to increasing reliance on network-accessible computers, network security has become a major issue for organizations and individuals. To help ensure the security of their computers, organizations and individuals frequently install security devices between public networks and their private networks. A goal of such security devices is to prevent unwanted or malicious information from the public network from affecting devices in the private network.

These security devices are commonly referred to as firewall device. Typically, the firewall is a dedicated device that is configured to permit or deny traffic flows based on an organization's security policies. The firewall may provide additional services, such as anti-virus (AV) scanning and detection, intrusion detection protection (IDP) and/or any other security services. The firewall device typically intercepts packets entering and leaving the private network and determines whether to permit or deny the packet based on information included within each packet that may define a state of a flow associated with the packet.

Usually the firewall performs this flow-based forwarding by caching or otherwise storing, for a given session, the flow state of all the packets that belong to the same flow. The first packet of a flow establishes a session, which the firewall notes by storing the new session. The firewall may inspect new sessions by performing anti-virus or other intrusion detection actions. The firewall however need not inspect subsequent packets that correspond to the same flow as closely as the first packet, as the firewall may determine, from the inspection of the first packet, that the flow does not constitute much of a threat. As a result, the firewall may comprise two paths, a first path for inspecting a first packet of a newly established flow and a second path for inspecting subsequent packets associated with a pre-existing flow. The first path may be referred to as the "first path" and the second path may be referred to as the "fast path" because the second path normally does not take as long to traverse as the first path due to the lack of detailed inspection.

In general, it is often desirable to partition and allocate the resources of the firewall so as to achieve different Quality of Service (QoS) for different types of packet flows. This is often problematic in that the handling of new packet flows and establishing new sessions often consumes a non-deterministic amount of the resources of the firewall, while handling packets associated with pre-established packet flows usually consumes a known or deterministic amount of the resources of the firewall.

SUMMARY

In general, a network device is described that incorporates a packet processing and forwarding data plane that utilizes feedback controlled, dynamically adjusted weighted queues for buffering network packets. The data plane of the network device assigns each queue a weight, and packet processing software threads service the queues and forward the network packets buffered therein based on assigned weightings. For example, the data plane of the network device may dequeue a number of distinct data units, e.g., packets, from each respective queue in a round robin manner, where the number of packets extracted from each queue is equal to or proportional to the respective weight assigned to the queue. Thus, the data plane may dequeue and process more packets stored to a higher weighted queue (e.g., a queue associated with a higher weight) than a lower weighted queue (a queue associated with a lower weight) for each round robin cycle.

The network device may utilize the weighted queues to provide levels of packet forwarding service for different types of network traffic. For example, the network device may assign network traffic of a higher level of service may be stored to higher weighted queues and thereby receive preferential treatment.

The dynamic queue management techniques described herein provides closed-loop feedback over the queue weightings. That is, the data plane of the network device measures the actual processor utilization when servicing each of the packet queues and then may, under congestion conditions, dynamically adjust the weights of each of the queues based at least in part on measured processor utilization. Packet queues that are utilizing processor cycles exceeding their assigned quota (where the quota is assigned by a user or administrator and represents the quota desired by the user or administrator) may have their weightings reduced, while queues that underutilize the processor will have receive a weighting increase. In this way, the closed-loop dynamic queue management techniques ensure that a processor adheres to preset utilization levels during times of congestion but remains more fully utilized during times of less relative congestion. By doing so, packets assigned a higher level of service are ensured a set amount of processor time during times of congestion, thereby enabling network devices to meet QoS agreements or otherwise process packets an administrator deems of high importance during even the most congested times. Moreover, in this way, the feedback applied by the data plane of the network device is not based solely on available bandwidth or how many packets the network device transmits.

Extracting maximum processor utility can be of particular importance when multiple processors or multi-core processors are employed in a highly distributed data plane. The dynamic queue maintenance techniques described herein may achieve optimal levels of processor utility in these highly distributive systems that include multi-core processors.

For example, a network device comprising a plurality of packet processing nodes may employ the dynamic queue management techniques. The packet processing nodes may each comprise a highly parallelized multi-core processor. The multi-core processor may execute a queue maintenance software module that monitors and determines, for each of the plurality of queues, a relative amount of time the multi-core processor consumes to service the respective queue. The queue maintenance module of each packet processing node determines, based on the assignment, a queue weight for each of the queues of that processing node. The queue weight defines a number of the plurality of packets de-queued and forwarded by the processor during each round robin iteration through the queues.

For example, each of the queue maintenance modules of the different packet processing nodes may compute, for each of the queues of the respective node, a number of cycles the multi-core processor requires to process the number of the packets specified by the queue weight associated with each of the queues. The number of cycles indicates an actual amount of time required to process the number of packets defined by each of the queue weights. As one example, the multi-core processor may maintain a cycle count register for each queue, and by resetting this cycle count register at the start of processing each queue and again at the end of processing each queue, the queue maintenance module may compute the cycle count for each queue. During time of congestion, the queue maintenance module of each node further dynamically adjusts, based on the computation, one or more of the queue weights such that subsequent amounts of processing time actually required to process the number of packets defined by each of the cycle counts more accurately reflects the weighting assigned to each of the queues.

When multiple processors are employed the effects of improper usage of each processor greatly amplifies the loss of packet throughput during times of congestion. Considering that multiple processors or cores reside within each of the packet processing nodes, the effects are again amplified. Total loss to packet throughput may by approximated at the total loss of packet throughput per processor (% loss) times the number of processors ($N_1$) multiplied again by the number of packet processing nodes ($N_2$) for a total loss of packet throughput equal to (% loss)×$N_1$×$N_2$. Thus, proper management of processor or core utility may be of critical importance so as to reduce this amplifying affect. The dynamic queue management techniques described herein therefore may reduce the % loss factor greatly during times of congestion.

In one embodiment, a method comprises assigning, for each queue of a plurality of queues within a network device, a quota desirable to a user and determining, based on the desirable quota assigned to each of the queues, a weight for each of the queues, wherein the weight defines a number of the plurality of packets to be de-queued and processed by a packet processing module executed by the processor during each iteration through the queues. The method further comprises processing one or more packets from the plurality of queues with the packet processing module executed by the processor in a round robin manner in accordance with the respective weight assigned to each of the queues and computing, for each of the queues, a number of processor clock cycles utilized by the packet processing module during at least one iteration through the queues to dequeue and process the number of the packets in accordance with the weight associated with each of the queues. The method also comprises dynamically adjusting, based on the computation, one or more of the queue weights such that subsequent amounts of processing time actually required to process the number of packets defined by each of the queue weights more accurately reflects the desirable quota assigned to each of the queues, and outputting with the network device the number of packets in accordance with the adjusted weights.

In another embodiment, a network security device comprises a plurality of queues that each store a plurality of packets, and one or more processors that execute a queue management module to assign, for each queue of the plurality of queues, a quota desirable and determine, based on the desirable quota assigned to each of the queues, a weight for each of the queues, wherein the weight defines a number of the plurality of packets to be de-queued and processed by the processor during each iteration through the queues. The one or more processors also execute a packet processing module that processes one or more packets from the plurality of queues in a round robin manner in accordance with the respective weight assigned to each of the queues. The queue management module further computes, for each of the queues, a number of processor clock cycles utilized by the packet processing module during at least one iteration through the queues to dequeue and process the number of the packets in accordance with the desirable quota associated with each of the queues and dynamically adjusts, based on the computation, one or more of the queue weights such that subsequent amounts of processing time actually required to process the number of packets defined by each of the queue weights more accurately reflects the desirable quota assigned to each of the queues. Moreover, the network security device outputs the number of packets in accordance with the adjusted weights.

In another embodiment, the invention is directed to a computer-readable storage medium containing instructions. The instructions cause a programmable processor to assign, for each queue of a plurality of queues within a network device, a quota desirable to a user and determine, based on the desirable quota assigned to each of the queues, a weight for each of the queues, wherein the weight defines a number of the plurality of packets to be de-queued and processed by a packet processing module executed by the processor during each iteration through the queues. The instructions also cause the processor to process one or more packets from the plurality of queues with the packet processing module executed by the processor in a round robin manner in accordance with the respective weight assigned to each of the queues, and compute, for each of the queues, a number of processor clock cycles utilized by the packet processing module during at least one iteration through the queues to dequeue and process the number of the packets in accordance with the desirable quota associated with each of the queues. The instructions further cause the processor to dynamically adjust, based on the computation, one or more of the queue weights such that subsequent amounts of processing time actually required to process the number of packets defined by each of the queue weights more accurately reflects the desirable quota assigned to each of the queues, and output with the network device the number of packets in accordance with the adjusted weights.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
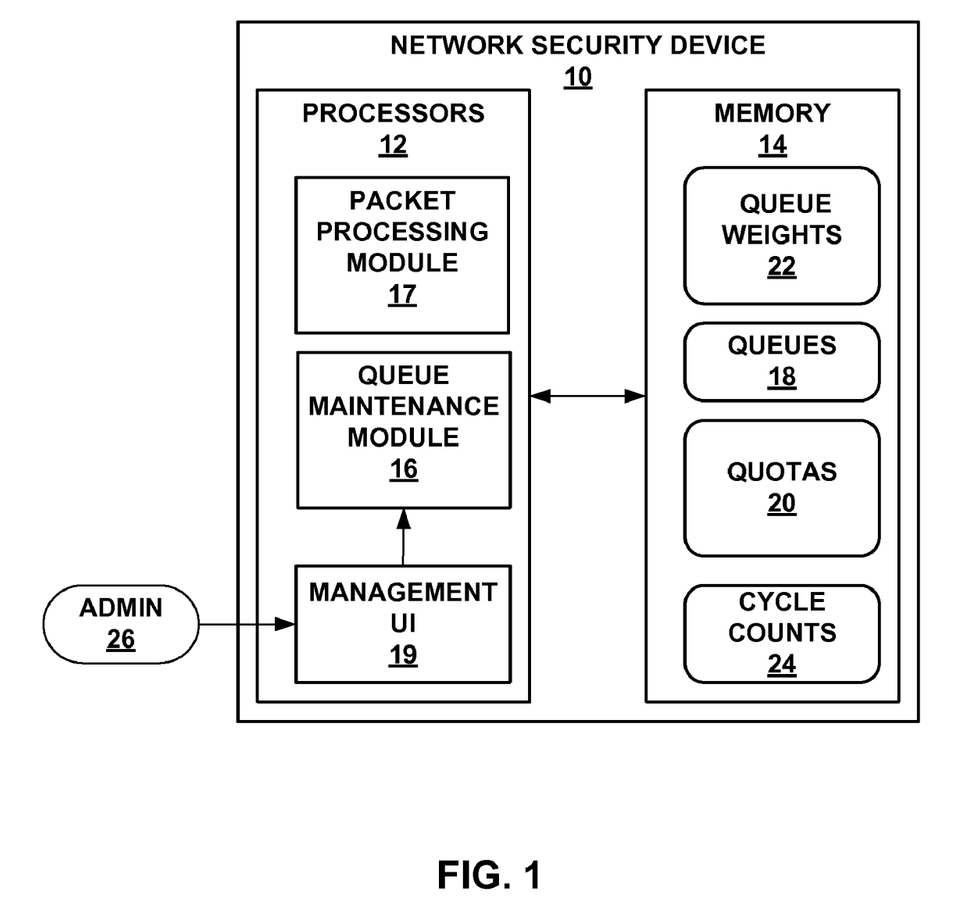
FIG. 1 is a block diagram illustrating an example network device that dynamically adjusts weights assigned to packet queues based on processor utilization in accordance with the dynamic queue management techniques described herein.

FIG. 1 is a block diagram illustrating an example network device 10 that dynamically adjusts weights assigned to queues based on processor utilization in accordance with the dynamic queue management techniques described herein. "Processor utilization" refers to the amount of processing time (measured in time or processor cycles) that a processor utilizes to process a configurable, pre-assigned number of packets de-queued from one of the packet queues. Although discussed herein in reference to a network device that processes packets, the dynamic queue management techniques may apply to any other device capable of implementing queues that store distinct data units and process the units according to a plurality of levels of service.

As shown in FIG. 1, network device 10 includes a plurality of processors 12 ("processors 12") coupled to a memory 14. Processors 12 may comprise a multi-core processor having a plurality of processors, such as described below in reference to FIG. 3. Processors 12 may, in some instances, comprise one or more dedicated packet forwarding integrated circuits, such as an application specific integrated circuits (ASICs). In other instances, processors 12 may comprise a highly-parallelized, general purpose multi-core processor that executes software instructions stored to a computer-readable storage medium, such as memory 14, where the instructions cause one or more of the processors to perform the dynamic queue management techniques described below.

Processors 12 provide an operating environment for execution of a queue maintenance module 16, a packet processing module 17, and a management user interface 19 ("management UI 19"). Queue management module 16 represents a module for managing or otherwise services packet queues 18 stored within memory 14, as well as, performing the dynamic queue management techniques described in more detail below. Packet processing module 17 represents a module that accesses queues 18 to retrieve packets stored to queues 18 and processes those packets as described below in more detail. Management UI 19 represents a module for presenting a graphical user interface (GUI), a command line interface (CLI), and/or any other interface capable of accepting input.

Memory 14 may store software instruction within any combination of static memory (e.g., a hard drive, compact disc, digital video disc, read only memory (ROM), electrically erasable programmable ROM (EEROM), and flash memory) and/or may store instructions and data within a dynamic memory (e.g., random access memory (RAM), static RAM (SRAM), dynamic RAM (DRAM), and a cache). Memory 14 stores a plurality of queues 18 ("queues 18"), a plurality of desirable quotas 20 ("desirable quotas 20"), a plurality of queue weights 22 ("queue weights 22"), and a plurality of cycle counts 24 ("cycle counts 24").

Each of queues 18 generally comprises a data structure that stores distinct units of data, such as packets, and may be organized according to a first-in, first-out (FIFO) scheme or a last-in, first-out (LIFO) scheme. A FIFO queue stores a plurality of packets, for example, in the order each packet was received by the queue and retrieves each of the plurality of packets according to that order. A LIFO queue functions similar to what is commonly referred to as a "stack," storing the packets in the order each of the packets was received by the queue but retrieving the packets in reverse order, thereby retrieving the last packet stored to the queue first. Although the dynamic queue management techniques are generally described herein in terms of FIFO queues, the invention should not be strictly limited to exclude LIFO or any other type or combination of types of queues.

Each of queues 18 are also associated with a different one of queue weights 22. When associated with a different one of weights 22, queues 18 are often referred to as "weighted queues." Queue weights 22 define the number of distinct data units, e.g., packets, processors 12 de-queues during each iteration when traversing or servicing queues 18. That is, processors 12 typically service or traverse queues 18 in a "round-robin" manner by continually iterating through queues 18, processing the number of packets defined by the associated weight 22, and repeating this process, never servicing or traversing a queue 18 twice before first servicing every other queue 18.

Weighted queues 18, however, allow for distinct levels of service, as processors 12 may de-queue and process more packets stored within a higher weighted queue (e.g., a queue 18 associated with a higher weight 22) than a lower weighted queue (e.g., a queue 18 associated with a lower weight 22). Thus, a type of network traffic assigned a higher level of service may be stored to higher weighted queues 18 and thereby receive preferential treatment. In effect, weighted queues 18, with respect to the dynamic queue management techniques described herein, enable network device 10 to allocate more of the available processor utilization to those packets assigned a higher level of service and less bandwidth to those packets assigned a lower level of service or vice versa. Although described herein with respect to higher and lower weights, the techniques may be applied in instances where lower weighted queues receive preferential treatment over higher weighted queues.

In one example embodiment, processors 12 traverse queues 18 in a round robin manner, processing the number of packets defined by the different one of queue weights 22 associated with queues 18 to provide different levels of service. Admin 26 may specify the type of network traffic or otherwise provide rules that differentiate between received packets so as to assign those packets to one of the plurality of levels of service. Admin 26 may further designate one or more of the plurality of queues 18 to store packets corresponding to a different one of the levels of service. Typically, admin 26 specifies this information as a set of commands entered into a CLI presented by management UI 19 and/or by interacting with a GUI presented by management UI 19.

Admin 26 may further, through interactions with management UI 19, specify and assign one of desirable quotas 20 to each of queues 18. Desirable quota 20 represent the relative amount of processor time or usage processor 20 spends processing packets stored to the respectively assigned queues 18. Typically, quotas 20 reflect a quota desirable to the admin 26, and may be referred to herein as "desirable quotas 20." Desirable quotas 20 may therefore represent relative processing times. Management UI 19, in response to this input by admin 26, interacts with queue maintenance module 16, whereupon queue maintenance module 16 specifies and assigns one of desirable quotas 20 to the indicated one of queues 18. In other words, queue maintenance module 16 assigns or associates one of desirable quotas 20 with a corresponding one of queues 18. In assigning one of desirable quotas 20 to one of queues 18, admin 26 attempts to limit the amount of time processors 12 utilize processing packets from the different queues 18.

As a simple example, memory 14 may store a total of two queues 18 and admin 26 may specify two desirable quotas 20. Admin 26 may express desirable quotas 20 in terms of percentages, the sum total of which is less than or equal to 100%. Alternatively, admin 26 may express desirable quotas 20 in terms of a ratio, a fraction, or any other relative term. To continue the example, admin 26 may specify two desirable quotas 20 of 60% and 30%, leaving the final 10% for general processing, and assigning each of desirable quotas 20 to respective queues 18 herein referred to as Q1 and Q2 for purposes of example.

After desirable quotas 20 are defined, queue maintenance module 16 computes, for each of queues 18, a queue weight 22 based on desirable quotas 20 assigned to each of queues 18. To continue the above example, queue maintenance module 16 may compute a first queue weight 22 of "6" based on the one of desirable quotas 20 specified as 60% and a second queue weight 22 of "3" based on the one of desirable quotas 20 specified as 30%, where each queue weight indicates a number of packets to de-queue and process from the respective queue before servicing the next queue. That is, queue weights 22 may, in effect, allocate portion of the available bandwidth to each of queues 18. After determining queue weights 22, queue maintenance module 16 may initially assign or otherwise associate queue weights 22 with the respective one of queues 18. In this manner, queue maintenance module 16 may configure queues 18 as weighted queues.

Once configured, admin 26 may enable or reset network device 10 or otherwise cause network device 10 to begin receiving packets. Processors 12 receive the packets and stores the received packets to one of queues 18. Processors 12 typically inspect information found within the packet and based on this information, determine one of the levels of service to which the packet belongs.

For example, processors 12 may identify that an incoming packet comprises a packet associated with a packet flow session that has not previously been received by the device. Processors 12 may distinguish between packet flow sessions based on a five-tuple found within a header of each received packets. The five-tuple may comprise a source Internet Protocol (IP) address of the origination device, a destination IP address, a source port, a destination port, and a protocol identifier. Processors 12 may extract this information from the packet header and attempt to look-up the five-tuple in a flow session table (not shown in FIG. 1) stored locally to processors 12 (such as within memory 14). If the packet flow is not currently present within the flow table, processors 12 may store the packet to a first queue 18 for detailed processing. However, if the flow session is present, processors 12 may store the packet to a second queue 18.

Packets not matching existing flow sessions are referred to herein as "first path" packets because these packets represents packets from flows that are new to network security device 10. Commonly, processors 12 execute additional modules such as a firewall module, an anti-virus module, attack detection and prevention modules, etc. that may apply deep packet inspection to ensure these first path packets are legitimate and/or valid. These additional steps require establishing and recognizing a flow session within network 10 and typically require execution of additional software modules. Initialization of this process upon detecting a new flow session is collectively referred to as processing the packets along a "first path." Successive packets associated with the same flow do not typically need to undergo all of these initialization steps. Subsequent packets matching flow sessions within the current flow table are referred to herein as "fast path" packets because these packets may not incur the additional delays associated with the first path, and thus typically traverse network device 10 much faster than the first path packets. The steps these packets undergo may therefore be minimal, and thus this path may be referred to as the "fast path."

Again, to continue the above example, admin 26 may configure queues 18 such that Q1 stores fast path packets and Q2 stores first path packets, thereby allocating 60% of the relative processing time of processors 12 to fast path packets and 30% to first path packets. Admin 26 may specify these desirable quotas 20 because, on average, processors 12 may need to process twice as many fast path packets than first path packets within a set amount of time. Although described in reference to fast path and first path levels of service, any information may form the basis of differentiating between the plurality of levels of service. That is, processors 12 may base the decision on a protocol to which each packet conforms, a source or destination address or set of addresses, a port number or set of port numbers, a checksum calculation, or any other information contained within either a header or data portion of a packet. The invention should therefore not be strictly limited to the exemplary embodiment described herein.

After assigning the incoming or received packets to queues 18, processors 12 traverse queues 18 in a round robin manner, servicing or traversing queues 18 in accordance with queue weights 18. That is, processors 12 may access Q1 of queues 18, for example, and process and forward six fast path packets stored to Q1 in accordance with the first queue weight 22. Processors 12 next may access Q2 of queues 18 and process and forward three first path packets stored to Q2 in accordance with the second queue weight 22. Processors 12 may repeatedly iterate through queues 18 in this manner.

During times of relatively light traffic or congestion, processors 12 may provide enough throughput, processing power, or utility to service queues 18 based on the initial weighs 20 and may not strictly enforce desirable quotas 20. Thus, in such light traffic times, processors 12 may service the packets according to the weightings in an open-loop manner (i.e., without applying closed-loop feedback). This open-loop manner may be independent of processor utilization. That is, the open-loop manner may be based on bandwidth utilization in that processor utility is not monitored and instead queue weights 22 determine how many packets from each queue are processed by processors 12.

However, the actual amount of time used by processors 12 to service the packets de-queued from the different queues may vary, and may therefore deviate in proportion from the assigned weightings. That is, some first path packets, for example, whose estimated processing times are indeterminable due to the variety of protocols and modules that processors 12 may execute to ensure these first path packets are legitimate, may require a longer time to process and forward than others packets. Fast path packets, on the other hand, typically have very determinable processing times because processors 12 do not typically execute further modules to evaluate these fast path packets.

Continuing with the example above, due to the indeterminate processing time, in some instances processors 12 therefore may utilize more than the assigned 30% of its processing time to process and forward so-called first path packets. For example, even though packets are de-queued according to a 30/60 weighting, actual processor utilization with respect to the first path packets may deviate from the assigned 30% weighting and may approach or exceed 50% levels, thus leaving a remaining processor utilization of 40-50% for the fast path packets. During times of relatively light packet traffic or, in other words, relatively light processor utilization, admin 26 may prefer the imbalance so as to fully utilize processors 12.

However, during times of high network congestion, where processors 12 are being fully utilized or the utilization of processors 12 approaches 100%, admin 26 may prefer an allocation of the processing power that more closely tracks the defined desirable quotas 20. Thus, queue maintenance module 16 transitions from the open-loop weighted queue technique used during light traffic to a closed-loop, negative-feedback approach in which queue weights 22 are dynamically adjusted based on actual processor or CPU utilization for each queue so as to track and ultimately converge toward the specified desirable quotas 20. This closed-loop or negative-feedback approach may therefore be considered dependent on processor utilization in contrast to the open-loop approach described above that is independent to processor utilization.

In accordance with the queue management techniques described herein, queue maintenance module 16 computes cycle counts 24, one for each of queues 18, during times of congestion, i.e., when queue lengths for one or more of queues 18 exceed a threshold(s). Each of cycle counts 24 corresponds to a different one of queues 18 and represents a number of cycles that processors 12 previously used when de-queuing and processing the number of packets in accordance with the respective one of queue weights 22. The number of cycles indicates an actual amount of clock cycles that were used to process the number of packets defined by each of queue weights 22.

In one example, queue maintenance module 16 may compute cycle counts 24 under high-traffic conditions in the following manner. While a software thread executing in parallel across processors 12 traverses queues 18, queue maintenance module 16 may record the number of processor clock cycles or ticks within a register or other data structure. The register may comprise a hardware register physically included within processors 12 or a software register maintained and presented by processors 12. Queue maintenance module 16 may determine when processors 12 first begin processing one of queues 18 by, for example, monitoring access to each of queues 18 and resetting the register to zero or store the current value for later comparison.

While processing that queue 18, processors 12 may update the register by incrementing the register by one upon the occurrence of each clock cycle or tick. For example, the register may be a hardware-based counter that increments each clock cycle. Queue maintenance module 16 may next determine when processors 12 complete the processing of one of queues 18 by, for example, monitoring access to a subsequent one of queues 18. At this point, queue maintenance module 16 reads the number within the register, and stores the difference between the number stored to the register at the completion of processing and the number stored to the register at the beginning of processing. Queue maintenance module 16 may next store this cycle count as one of cycle counts 24 and associate this cycle count to the one of queues 18 for which the cycle count was computed. Queue maintenance module 16 may compute, in this manner, a cycle count 24 for each of queues 18.

After computing each of cycle counts 24 for a single traversal of queues 18 by processor 12, queue maintenance module 16 may apply negative feedback to dynamically adjust queue weights 22. Alternatively, queue maintenance module 16 may record the cycle counts and adjust queue weights 22 at set intervals of time, such as every 5, 10, 25, 50, or 100 traversals of queues 18 or every 100, 500, or 1000 milliseconds. In this embodiment, queue maintenance module 16 may update cycle count 24 by summing or averaging the current value stored to cycle count 24 with the recent cycle count determined for the last traversal of the associated one of queues 18. Queue maintenance module 16 then may adjust queue weights 22 based on these summed clock cycles 24.

Queue maintenance module 16 may adjust queue weights 22 by computing a new queue weight 22 to replace previous queue weights 22. The function may compute the new queue weight 22 based on the respective desirable quota, previous respective queue weight 22, and respective cycle count 24. The function may implement any algorithm that may be used in a feedback control system. That is, the function may, for example, implement one or more of a Proportional-Integral-Derivative (PID) control algorithm, an adaptive PID control algorithm, a linear control algorithm, and a nonlinear control algorithm.

Upon adjusting queue weights 22, processors 12 traverses queues 18, as described above, and processes the number of packets indicated by adjusted queue weights 22. This process may continue indefinitely or may stop once congestion levels no longer exceed a congestion threshold. That is, queue maintenance module 16 may monitor queues 18 and determine a congestion level based on the number of packets stored to one or more of queues 18. If the determined congestion level exceeds a predefined or adaptive congestion threshold, queue maintenance module 16 may continue to adjust queue weights 22. If the determined congestion level no longer exceeds the congestion threshold, queue maintenance module 16 may halt adjustment of queue weights 22.

Alternatively, queue maintenance module 16 may stop adjusting queue weights 22, or may adjust weights 22 more infrequently, once clock cycles 24 converge to within a threshold deviation from desirable quotas 20. That is, queue maintenance module 16 may determine an adjustment amount for each of queue weights 22 by computing a difference, for each of queue weights 22, between a previous value of queue weights 22 and a current or adjusted value of queue weights 22. Once this difference converges below a defined minim adjustment amount, such as less than one packet, queue maintenance module 22 may scale back the time between dynamic adjustments to queue weights 22 or possibly halt the dynamic adjustments altogether until such time as further adjustments are required.

Figure 3A:
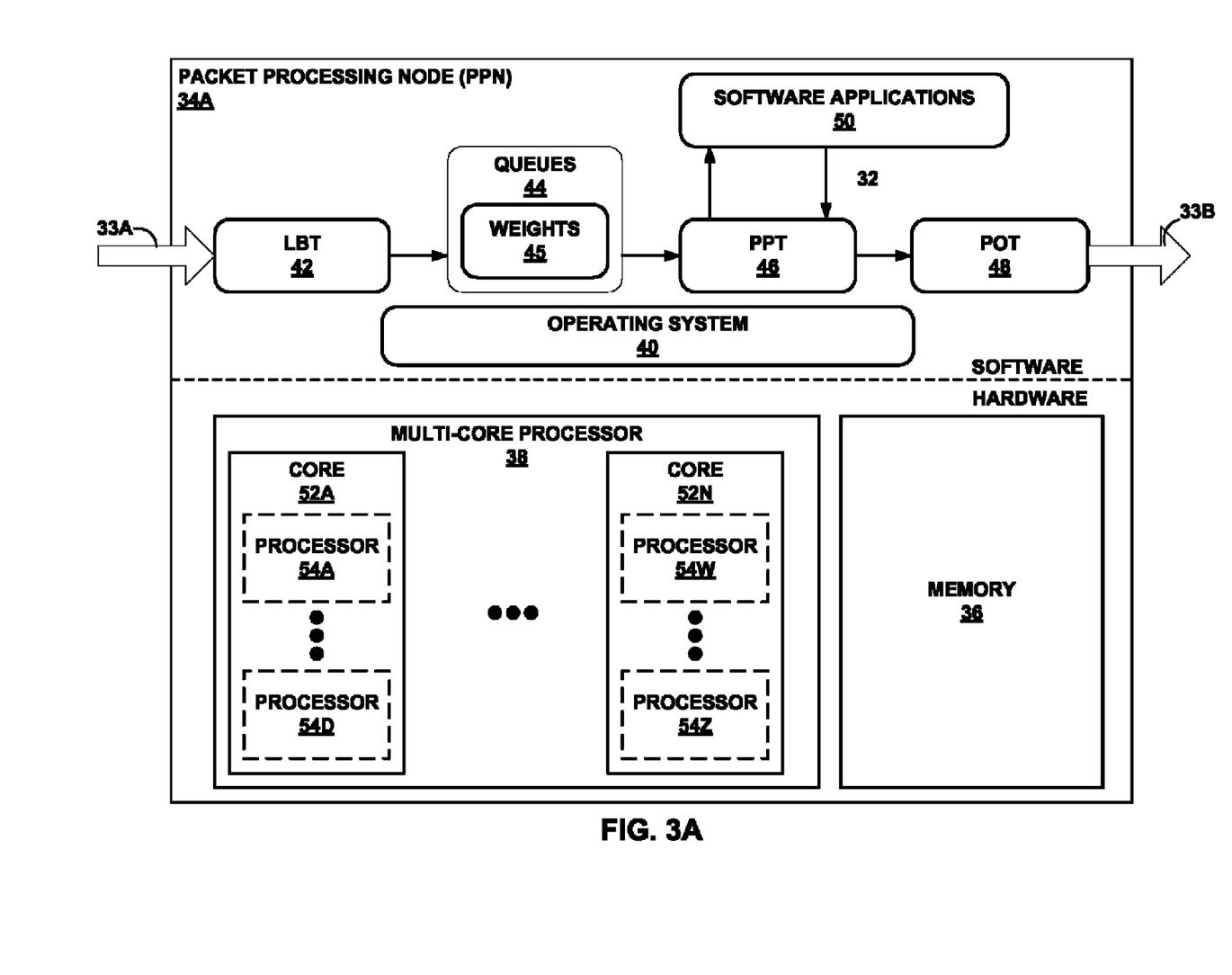
FIGS. 3A and 3B are block diagrams illustrating packet processing node of FIG. 2 in more detail.
Figure 3B:
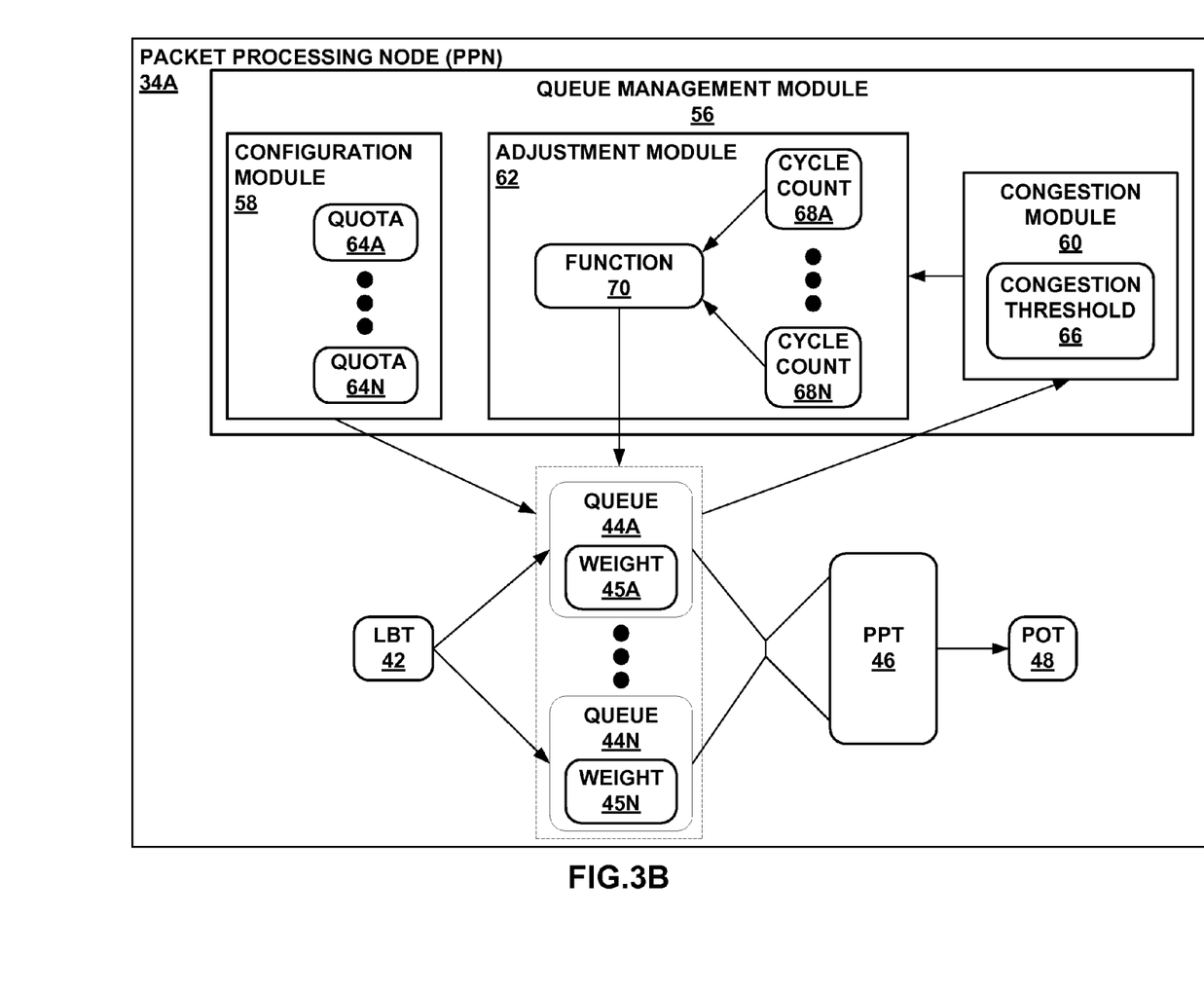
Figure 4:
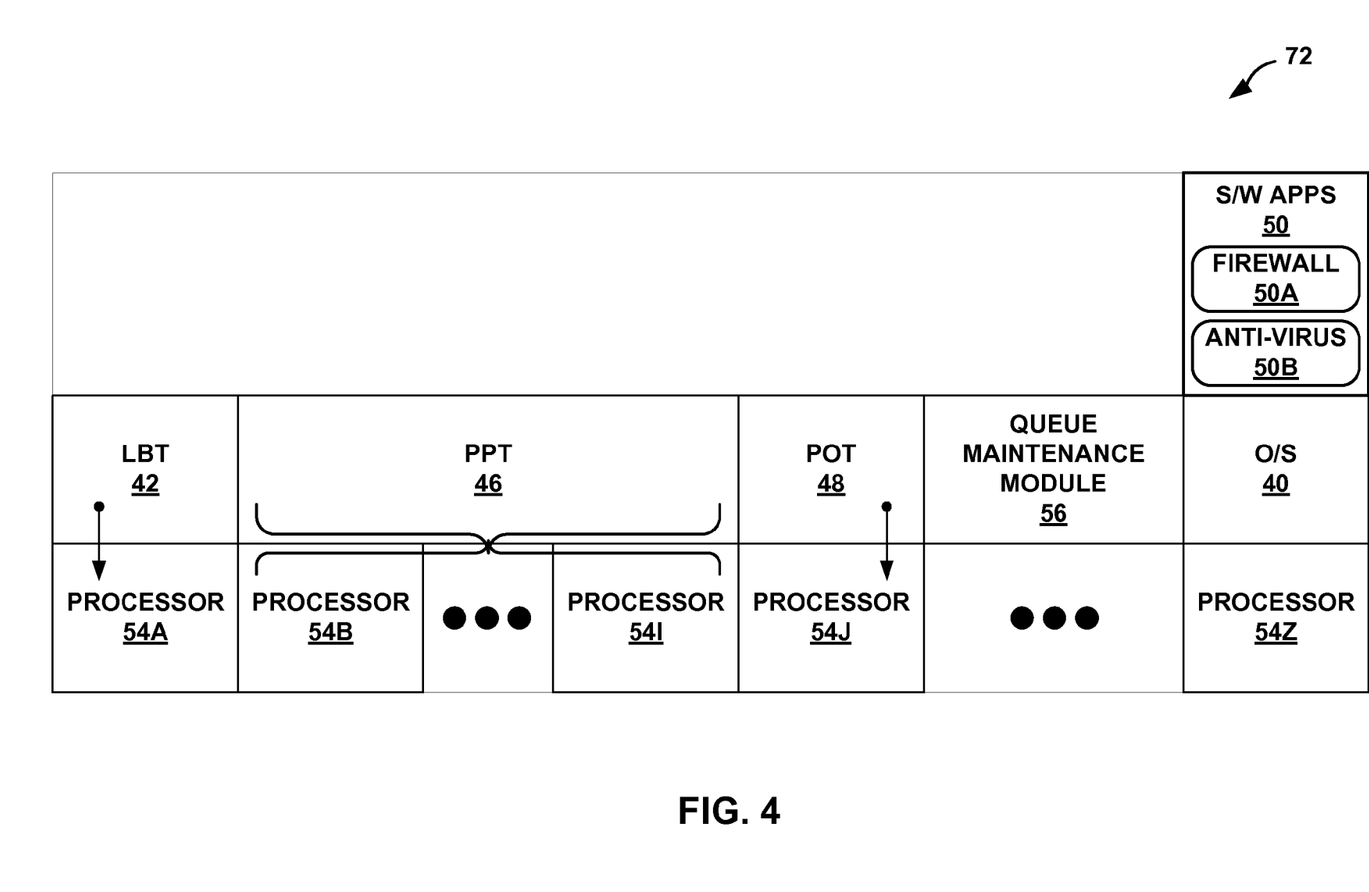
FIG. 4 is a block diagram illustrating an example logical view of affinity between processors of a multi-core processor and a plurality of software threads that service weighted queues.

In this manner, network device 10 may implement the dynamic queue maintenance techniques to ensure predefined queue weightings, e.g., desirable quotas 20, of processors 12 are more strictly enforced using closed-loop feedback during periods of congestion. Conventional queue maintenance techniques focus on bandwidth allocations and often attempt to adjust queues based on a measure of the bandwidth actually allocated to each of queues (e.g., solely based on number of packets processed from each queue). The dynamic queue maintenance techniques described herein, however, can dynamically transition to control algorithms that are based at least in part on actual processor utilization for adjusting queues 18. In alternative embodiments, where a number of multi-core processors are utilized, the benefits of these techniques become even more significant. Accordingly, the following FIGS. 2-4 illustrate and the accompanying description describes an embodiment wherein a network security device includes multiple multi-core processors that each implements the dynamic queue maintenance techniques described in this disclosure.

Figure 2:
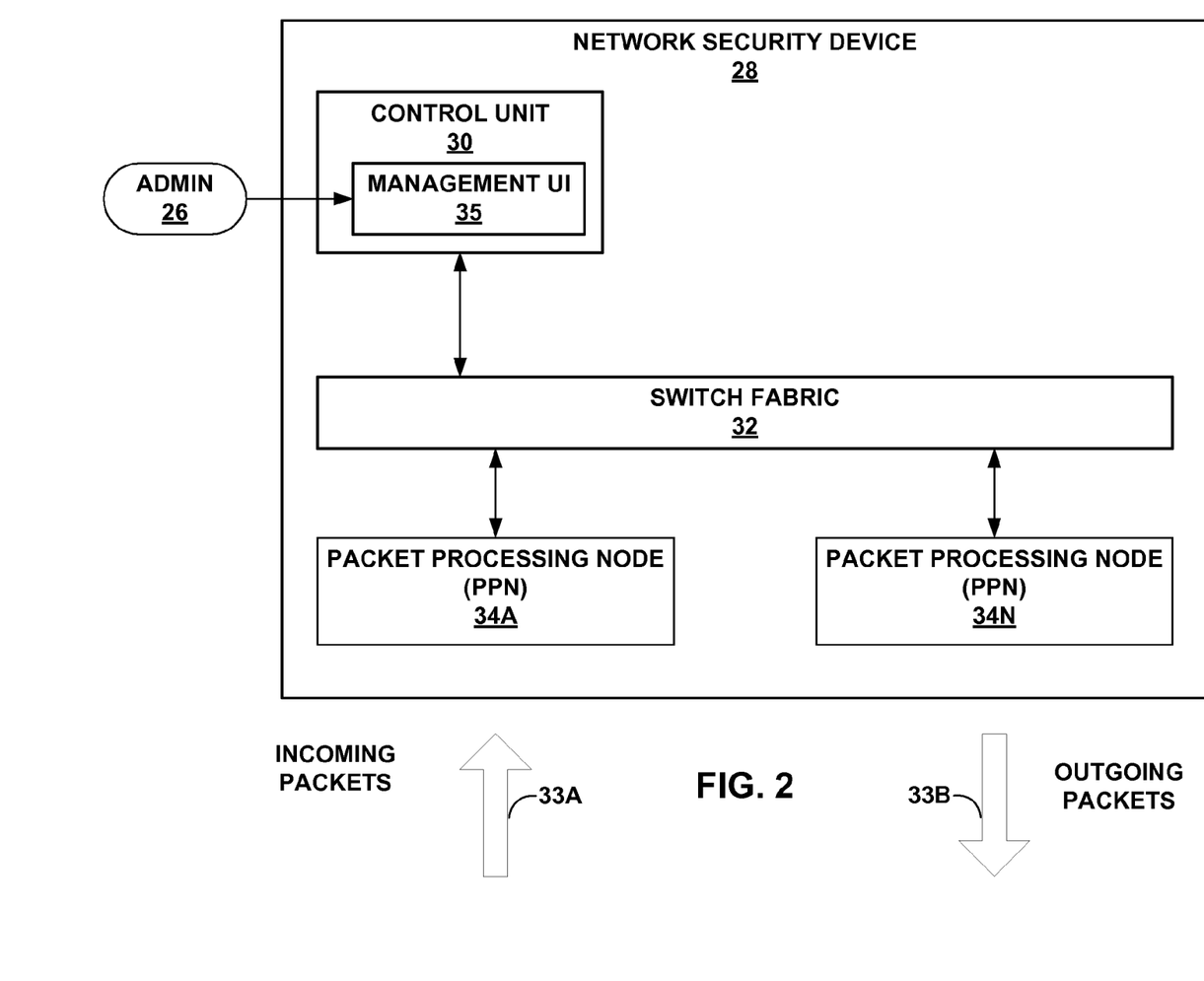
FIG. 2 is a block diagram illustrating an example network security device having a plurality of packet processing nodes that performs the dynamic queue management techniques described herein within the context of a highly distributive data plane.

FIG. 2 is a block diagram illustrating an example network security device 28 that performs the dynamic queue management techniques described herein within the context of a highly distributive data plane. As shown in FIG. 2, network security device 28 comprises a control unit 30, a switch fabric 32, and a plurality of Packet Processing Nodes 34A-34N ("PPNs 34").

Control unit 30 represents what is commonly referred to as a "control plane." Typically, the control plane, e.g., control unit 30, executes the necessary modules required to control network security device 28. Control unit 30 includes a management UI 35, which may be substantially similar to management UI 19 of FIG. 1. Switch fabric 32 represents any high speed switch capable of communicatively coupling any combination of at least two endpoints, e.g., control unit 30 and PPNs 34, to one another.

Although not shown in FIG. 2, network security device 28 may comprise a chassis in which a number of cards are inserted, one or more cards containing the control plane, e.g., control unit 30, and one or more cards for each of PPNs 34, where PPNs 34 can collectively be referred to as a "data plane." Switch fabric 32 may therefore couple each of these cards or blades to one another and may be referred to as a "switch fabric backplane" in these instances. When the data plane comprises multiple PPNs 34, the data plane may be described as a "highly distributed" data plane because the packet processing functions commonly associated with the data plane are distributed across a number of PPNs 34 instead of being consolidated within a single PPN 34, processor, or control unit.

As described in more detail below, PPNs 34 may each comprise a plurality of processors, similar to processors 12, and a memory to store a plurality of weighted queues, similar to queues 14. The memory may comprise any combination of the above listed static and dynamic memory. As described above, admin 26 may interact with management UI 35 to configure the plurality of weighted queues by specifying relative processing times, such as desirable quotas 20. Admin 26 may then enable PPNs 34 or otherwise cause PPNs 34 to receive packets. Each of PPNs 34 may receive these packets, i.e., incoming packets 33A, store those packets 33A to the weighted queues, process those packets 33A, and output outgoing packets 33B. Accordingly, each of PPNs 34 may implement the dynamic queue management techniques described herein to facilitate maximum processor utilization, the benefits of which may be more readily ascertainable in this highly distributive context.

That is, when using only a single processor, the affects of improper processor usage during times of congestion may slacken packet throughput but not drastically. When multiple processors are employed, such as processors 12 of FIG. 1, the effects of improper usage of each processor amplifies the loss of packet throughput during times of congestion, but again this still may not reach critical levels. However, considering that multiple processors are included within each of PPNs 34, the effects are again even further amplified by the number of PPNs, which may substantially increase the effects of improper processor utilization. Total loss to packet throughput may by approximated as the total loss of packet throughput per processor (% loss) times the number of processors ($N_1$) multiplied again by the number of packet processing nodes ($N_2$) for a total loss of network security device packet throughput equal to (% loss)$\times N_1 \times N_2$. Thus, proper management of processor utility may be useful in order to reduce these amplifying effects. The dynamic queue management techniques described herein may reduce the % loss factor greatly during times of congestion, thereby enabling network security device to more efficiently process packets 33A.

FIGS. 3A and 3B are block diagrams illustrating packet processing node 34A of FIG. 2 in more detail. FIG. 3A shows PPN 34A in a functional manner to illustrate the interworking of software and hardware in an exemplary implementation of the techniques described herein. FIG. 3B shows PPN 34A in a logical manner to illustrate the logical interaction between modules regardless of the underlying physical implementation.

As shown in FIG. 3A, PPN 34A includes two functional portions. In the bottom portion labeled "hardware," PPN 34A includes hardware, such as memory 36 and multi-core processor 38, that provides an operating environment for executing software modules. In the top portion labeled "software," PPN 34A includes software, such as an operating system 40, a load balancing thread 42 ("LBT 42"), software weighted queues 44 ("queues 44"), packet processing thread 46 ("PPT 46"), packet ordering thread 48 ("POT 48"), and software applications 50. The hardware portion represents the hardware that may, in some instances, support execution of the software shown in the software portion. That is the software may be stored to memory 36 and executed in parallel across multi-core processor 38. Although the above hardware and software are described in reference to PPN 34A, each of PPNs 34 may include similar hardware and software and the techniques should not be limited in this respect. Moreover, PPN 34A may comprise other hardware and software not illustrated in FIG. 3.

Memory 36 may be substantially similar to memory 14 of FIG. 1 in that memory 36 also may comprise any combination of the static and/or dynamic memory listed above. Memory 36 may store queues 44, as well as, any other information that may be required to implement the dynamic queue management techniques described herein, such as the above described cycle counts, relative processing times, and congestion threshold.

Multi-core processor 38 comprises a plurality of cores 52A-52N ("cores 52"), where cores 52 collectively include a plurality of processors 54A-54Z ("processors 54"), which may be similar to processors 12 of FIG. 1. That is, core 52A includes processors 54A-54D and core 52N includes processors 54W-54Z, for example. In some instances, those processors 54 within a single core 52 may share certain processing resources, such as a layer-1 or layer-2 cache. Multi-core processor 38 may represent a plurality of processors 54 that share a single physical package. The dashed lines of processors 54 are intended to indicate that processors 54 can be separate hardware processing units (each having a corresponding processing unit and supporting registers) sharing a single physical packaging of a respective one of cores 52. In some embodiments, cores 52 also share the same physical packaging of multi-core processor 38. The techniques, while described in reference to multi-core processor 38, also contemplate embodiments comprising a plurality of processors, each processor having a separate packaging. Furthermore, the use of letters to designate processors 54 and cores 52 should not be construed literally, but are intended to represent that any number of processors 54 may be included within cores 52 and any number of cores 52 may be included within a multi-core processor 38.

One or more of processors 54 of one or more of cores 52 may execute operating system 40, LBT 42, queues 44, PPT 46, POT 48 and software applications 50. O/S 43 may represent a module that provides a standard operating system, such as a real-time operating system or a Unix-based operating system, an operating system dedicated to processing of packet or other data units, or any other conventional operating system. One or more of LBT 42, queues 44, PPT 46, POT 48 and software applications 50 may execute on top of or, in other words, within the execution environment provided by operating system 40.

LBT 42 represents a software module responsible for distributing received packets, messages, and/or events to queues 44 based on a type included within a header of each packet or any other information included within each packet. For example, LBT 42 may inspect a Meta header of a received packet to determine the packet type and assign the packet one of a plurality of levels of service based on this type. LBT 42 may assign the decided level of service by storing the packet to one of queues 44. If the decided one of queues 44 is full or otherwise near capacity, LBT 42 may perform a technique referred to as Tail Random Early Drop (TRED) or any other similar technique to determine which of the packets to drop.

Queues 44 each represent a software module, such as a software data structure, that implements one of the above described queues. Queues 44 include associated queue weights 45, which as described above, are dynamically adjusted according to the dynamic queue management techniques described herein.

PPT 46 represents a software module responsible for dequeuing and processing packets stored to queues 44. For example, PPT 46 may implement the above described steps of either the first path or the fast path. POT 48 represents either a hardware and/or software module responsible for re-ordering packets after they have been processed by PPT 46 prior to forwarding these packets to respective next destinations or "hops" (i.e., neighboring network devices).

Software applications 50 represent those firewall, anti-virus, attack detection and prevention or other deep packet inspection modules described above. Although described herein as software, the techniques contemplate, as mentioned above, that these software modules may be implemented as either a standalone hardware module or a combination of both hardware and software. Thus, the principles of the invention should not be strictly limited to the illustrated embodiment.

As described above, one or more of processors 46 of each of cores 52 may provide hardware resources for executing the above described software modules. In particular, one of more of these processors 54 may be associated with one or more software threads for software modules 42, 46 and 48 in that each of the software threads may be confined to one or more of the processors for execution. This association is often referred to as "affinity" or "processor affinity." Processor affinity is described below in more detail with respect to FIG. 4, however as a brief example, processor 54A may be associated with, and only execute, LBT 42. Processors 54B-54Y of cores 52 may be associated with, and only execute, PPT 46. Processor 54Z may be associated with, and only execute, POT 48.

Assuming the above exemplary processor affinity for purposes of illustration, LBT 42 executes on processor 54A to receive and assign incoming packets 33A to one of queues 44. PPT 46 execute in paralyzed fashion across processors 54B-54Y to dequeue those packets 33A from queues 44 in accordance with weights 52, as described above. That is, each of processors 54B-54Y execute PPT 46 in a distributive or parallel processing manner, whereby each of processors 54B-54Y process packets stored to a single one of queues 44. PPT 46 may provide for conflict resolution and address other parallel processing concerns to resolve, for example, simultaneous attempts to access, processor or otherwise dequeue the same packet by two or more of processors 54A-54Y. Upon servicing one of queues 44, processors 54B-54Y may traverse to a next one of queues 44 in the round-robin manner described above.

Processors 54B-54Y, in accordance with PPT 46, may transmit packets, such as those packets identified as first path packets, to software applications 50 for further inspection, sometimes referred to as "deep packet inspection." Deep packet inspection is intended to suggest that information within the packet is subjected to inspection by, for example, firewall, anti-virus software, and other security detection and prevention software, such as protocol inspection modules that ensure the packets adhere to protocol rules or specifications. If these first path packets, for example, pass the deep packet inspection, processors 54B-54Y receive these packets from software application 56 and forward these packets for processing by POT 48. If however these first path packets do not pass the deep packet inspection, either software applications 50 or PPT 46 may drop, detain, log, delete, remove or otherwise prohibit the packet from reaching a guarded private network. Those packets not subjected to deep path inspection, such as fast path packets, may be processed and forwarded to POT 48. POT 48 executes on processor 54Z to receive these packets and direct these packets for delivery as outgoing packets 33B.

As described in more detail with respect to FIG. 3B, PPN 34A may perform the dynamic queue management techniques described herein to adjust weights 52 so as to improve the utilization of multi-core processor 38. As shown in FIG. 3B, PPN 34A includes a queue management module 52 that manages queues 44 in accordance with the dynamic queue management techniques described in this disclosure. Queues 44 and weights 45 are shown in FIG. 3B as queues 44A-44N and weights 45A-45N to illustrate that queues 44 comprise a plurality of queues 44, each of queues 44 associated with a corresponding weight 45.

Queue management module 56 includes a configuration module 58, a congestion module 60 and an adjustment module 62. Configuration module 58 represents a module that receives desirable quotas 64A-64N ("times 64") from management UI 35 and configures weights 45 as described above. Congestion module 60 represents a module that monitors queues 44 and determines a level of congestion or congestion level, compares the level of congestion to a congestion threshold 66, and initiates the dynamic adjustment of weights 45 based on the comparison. Adjustment module 62 represents a module that determines cycle counts 68A-68N ("cycle counts 68") and dynamically adjusts weights 45 in accordance with a function 70.

As described above, a user, such as admin 26, may interact with management UI 35 of FIG. 2 to configure queues 44 and specify a relative processing time for each of queues 44. Admin 26, in the instance of multiple PPNs 34, may configure each of queues 44 of each of PPNs 34 separately or collectively, as well as, specify a relative processing time 46 for each of queues 44 of each of PPNs 34 separately or collectively. Whether collectively or separately, control unit 30 may cause queue management module 56 and, more particularly, configuration module 58 of each of PPNs 34 to configure queues 44 and assign each of desirable quotas 64 to the specified one of queues 44 for each of PPNs 34.

Upon assigning each of relative processing times 46 to respective queues 44, configuration module 58 computes queue weights 45 based on respective desirable quotas 64, as described above. Queue weights 45 may be computed according to any linear or non-linear algorithm, as well as, any other algorithm commonly used to calculate queue weights. Queue weights 45 are shown in FIG. 2 as being included within queues 44 so as to indicate that queues 44 are associated with weights 45.

Once queues 44 are configured and weights 45 computed, admin 26 may enable network security device 28 to receive packets, whereupon LBT 42 stores each of the received or incoming packets 33A to one of queues 44 based on information included within each packet. PPT 46 processes packets stored to queues 44 in accordance with respective weights 45. PPT 46 forwards the processed packet to POT 48. POT 48 re-orders the packets before PPN 34A transmits the packets via an interface (which is not shown in FIG. 2 for ease of illustration).

While processing packets, congestion module 60 of queue management module 56 may monitor a level of congestion of one or more of queues 44 to determine whether the level of congestion exceeds congestion threshold 66. Admin 26 may specify congestion threshold 66 by, for example, specifying a percentage, such as 75%. Alternatively, queue management module 56 may be pre-configured with a default congestion threshold 66. In any event, one or more congestion thresholds 58 may be defined by which congestion module 60 may determine when to initiate dynamic adjustment of weights 45 in accordance with the dynamic queue management techniques described herein. In some embodiments, queue management module 56 may not include congestion module 60 and perform the dynamic queue management techniques regardless of congestion conditions or according to a pre-defined schedule. For example, admin 26 may specify periods of time during each day of the week that queue management module 56 performs the dynamic queue management techniques described in this disclosure.

As mentioned above, queue management module 56 may define a congestion threshold 66. Admin 26 may specify congestion threshold 66 by, for example, specifying a percentage, such as 75%. Alternatively, congestion module 60 of queue management module 56 may be pre-configured with a default congestion threshold 66. In any event, one or more congestion thresholds 66 may be defined by which congestion module 60 may determine when to begin dynamically adjusting weights 45 in accordance with the dynamic queue management techniques described herein. In some embodiments, queue management module 56 may not require a congestion module 60 or congestion threshold 66 and perform the dynamic queue management techniques regardless of congestion conditions or according to a pre-defined schedule. For example, admin 26 may specify periods of time during each day of the week that queue management module 56 performs the dynamic queue management techniques described in this disclosure.

In accordance with congestion aspect of the dynamic queue management techniques, congestion module 60 may monitor queues 44 to determine the number of packets stored to one or more of queues 44. If the number of packets, unavailable storage space, or a derivative thereof exceed congestion threshold 66, congestion module 60 may cause adjustment module 62 to begin computing cycle counts 68 for each of queues 44, and dynamically adjust weights 45 in the manner described above. For example, congestion module 60 may monitor queue 44A, which may represent the heaviest weighted queue, to determine the amount of memory occupied by packets stored to queue 44A and divide the occupied memory amount by a total amount of memory allocated to queue 44A to compute a level of congestion.

Alternatively, congestion module 60 may monitor the occupied storage space for each of queues 44, compute a congestion level for each of queues 44, and average the congestion levels to compute a total level of congestion. In yet another embodiment, congestion module 60 may monitor each queue 44, compute a congestion level for each of queues 44 based on the occupied storage space, and set the level of congestion to the maximum congestion level computed for each of queues 44.

Regardless of how the level of congestion is computed, if this level of congestion exceeds congestion threshold 66, congestion module 60 may cause adjustment module 62 to begin computing cycle counts 50 and dynamically adjusting weights 48, as described above. The techniques, while described above with respect to exceeding a congestion threshold 66, also include instances where the dynamic management techniques are initiated when a level of congestion falls below a congestion threshold 66, should the level of congestion be computed on an inverse metric, such as the amount of available space in each of queues 44.

Accordingly, adjustment module 62, at some point, computes cycle counts 68 for each of queues 44. Because multi-core processor 38 comprises a plurality of processors 55, adjustment module 62, in this instance, monitors a register associated with each of processors 54 that stores an incremental count of the clock cycles or ticks in the same manner described above with respect to processors 12. That is, adjustment module 62 may either reset each register or store the initial value of the register as the one or more of processors 54 executing PPT 46 begin processing packets stored to queues 44 in accordance with weights 45. Upon completion of processing the number of packets specified by the associated one of weights 45 or after a set period of time, as described above, adjustment module 62 may again store the final value stored to the register and compute each of cycle counts 68 as the difference between either the reset value or initial value and the final value (or total value if using set periods of time). Adjustment module 42 may therefore monitor a number of registers in parallel or nearly simultaneously in order to compute cycle counts 68.

Based on cycle counts 68, adjustment module 62 dynamically adjusts weights 45 in accordance with one or more of the above described control algorithms, as represented by function 70. The dynamic adjustment ensure processors 54 dedicate the amount of time specified by desirable quotas 64 to each of respective queues 44 possibly during times of relatively high congestion, as defined by congestion threshold 66. By monitoring the level of congestion, queue maintenance module 42 may maximize processor utilization, favoring greater utilization during time of relatively light congestion and limiting utilization to service queues 44 in accordance with relative processor times 64 during time of relatively high congestion.

FIG. 4 is a block diagram illustrating an example logical view 72 of affinity between processors of multi-core processor 38 of FIG. 3A and a plurality of software threads 42, 46, and 48 that service weighted queues 44. View 72 depicts various layers, where the lower layers depicted at the bottom of view 72 generally represent physical layers while higher layers depicted at the top of logical views 72 generally represent application layers. One-to-one affinity or one-to-one processor affinity is represented in FIG. 4 by a line having a filled-in circle at one end and an arrow at the other end. One-to-one processor affinity, which also may be referred to as "tight processor affinity," occurs when a single core executes a single thread. Many-to-many affinity or many-to-many processor affinity is represented in FIG. 4 by an x-shaped callout. Many-to-many processor affinity, which may be referred to as "loose processor affinity," occurs when a set of cores may execute a set of threads and no one core of the set of cores is bound to a single thread but may execute any thread within the set of threads.

As shown in FIG. 4, LBT 42 is assigned to processor 54A and represents an example of tight processor affinity or one-to-one processor affinity. PPT 46 is assigned to a set of processors 54B-54I and represents loose processor affinity or many-to-many processor affinity. Processors 54B-54I may each execute a duplicate of PPT 46 or may execute a portion of PPT 46 to service queues 44 in a round robin manner according to weights 44, as described above. POT 48 is assigned to processor 54J and represents yet another example of tight processor affinity. Queue maintenance module 56, operating system 40 ("O/S 40"), and software applications 50 ("S/W apps 50") are not assigned to any particular one of processors 54 and therefore any available one or more or all of processors 50 may execute these modules 40, 50 and 56.

As described above software applications 50 may execute on top of operating system 40. Software applications 50, as shown in FIG. 3, may include a firewall module 50A and an anti-virus module 50B. Software applications 50 may include other modules, but for ease of illustration purposes only includes modules 50A, 50B. Software applications 50 may execute "on top of" operating system 40, because operating system 40 provides an execution environment in which these modules 50 may execute. In other embodiments, software applications 50 may execute as stand-alone modules 50 and not require operating system 50 to provide an execution environment.

In the above manner, processors 54 may be assigned to software threads 42, 46, and 48 so as to enable processor affinity. Processor affinity may provide for higher throughput for operations, such as load balancing and packet ordering as implemented by LBT 42 and POT 48, by dedicating a single processor 54 to perform this task. Moreover, processor affinity may enable multiple processors 54 to collectively service a number of threads, which may also improve throughput.

Figure 5:
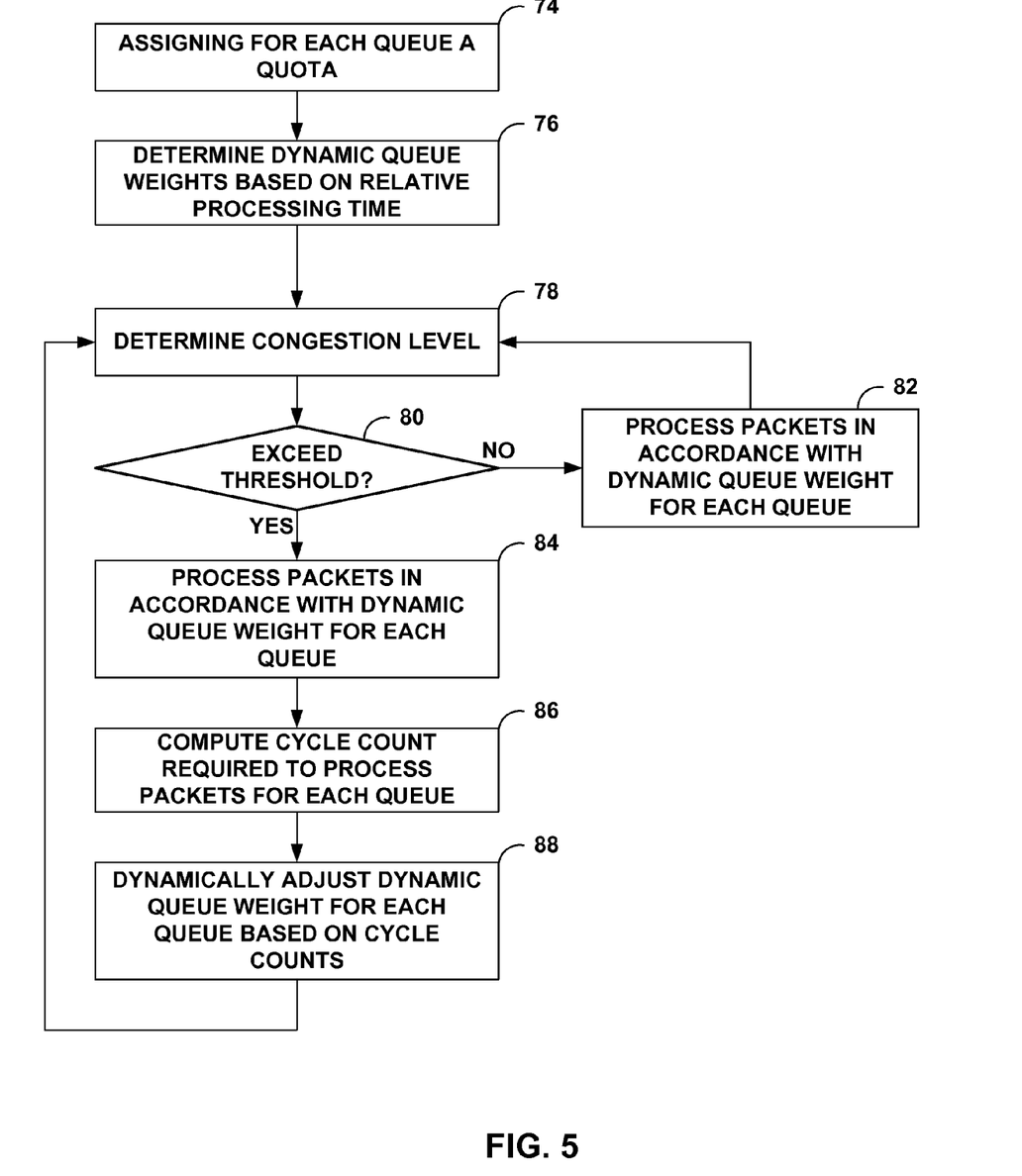
FIG. 5 is a flow chart illustrating an example operation of a network security device in performing the dynamic queue management techniques described herein.

FIG. 5 is a flow chart illustrating an example operation of a network security device, such as network security device 28 of FIG. 2, in performing the dynamic queue management techniques described herein. As described above, admin 26 may initially assign for each of a plurality of queues, such as queues 44 of FIG. 3B, a relative processing time, such as desirable quotas 64, via interactions with management UI 35 (74). Management UI 35 may forward via switch fabric 32 relative processing times 46 to queue management module 42, whereupon queue management module 42 stores desirable quotas 64, whereupon configuration module 58 of queue maintenance module 56 associates desirable quotas 64 to a corresponding one of queues 44.

Configuration module 58 next determines queue weights 45 for each of queues 44 based on desirable quotas 64 (76). Upon configuring queues 44 by assigning queue weights 45 to corresponding queues 44, network security device 28 may begin receiving packets. In particular, one of processors 54 executes LBT 42 to receive incoming packets and assigns these incoming packets to queues 44. This processor 54, in accordance with LBT 42, may determine which of queues 44 to assign the packets based on characteristics of the packets, such as whether the above described flow exists for the packet. LBT 42 may cause this processor 54 to analyze other characteristics, such as a type of protocol to which each packet corresponds, a destination IP address, a source IP address, a source or destination port, etc. to assign a packet a particular level of service. This processor 40, again in accordance with LBT 42, may assign the level of service by storing the packet to a particular one of queues 44 having a higher (or lower, in some instances) relative queue weight 45.

As the one of processors 40 executes LBT 42 to continue to store packets to queues 44, congestion module 60 of queue maintenance module 56 determines a level of congestion in the manner described above (78) and compares this level to congestion threshold 66 (80). If the level of congestion does not exceed congestion threshold 66, PPT 46, as executed by one or more of processors 54, processes packets stored by LBT 42 to queues 44 in accordance with queue weights 45 for each of queues 44 (82). If the determined level of congestion exceeds congestion threshold 66, PPT 46, as executed by one or more of processors 54, continue to processes packets stored to queues 44 in accordance with queue weights 45, however, congestion module 60 causes adjustment module 62 to compute each of cycle counts 68. Cycle counts 68 reflect the amount of processing time required for processors 54 to process packets stored to each respective one of queues 44 (84).

Upon computing cycle counts 68, adjustment module 62 of queue maintenance module 56 dynamically adjusts queue weights 45 for each of queues 44 based on respective cycle counts 68 (86). Queue maintenance module 56 may continue to determine the level of congestion based on the current queue storage levels, as described above, and dynamically adjust weights 45 for each of queues 44 to ensure processors 54 allocate processing time to each of queues 44 in accordance with desirable quotas 64. In this manner, queue maintenance module 56 may enable proper utilization of processors 54 so as to processes packets in accordance with desirable quotas 64, thereby possibly maximizing the utility of processors 54.

Although described above with respect to multi-core processor 38, the dynamic queue management techniques described herein may apply to any type of processor, such as single core processor. The techniques therefore contemplate any processor configuration as well as network devices that employ application specific integrated circuits. Moreover, as described above, the techniques may be applicable not only to network devices but to any device that offers varying levels of service to processes distinct data units.

Figure 6:
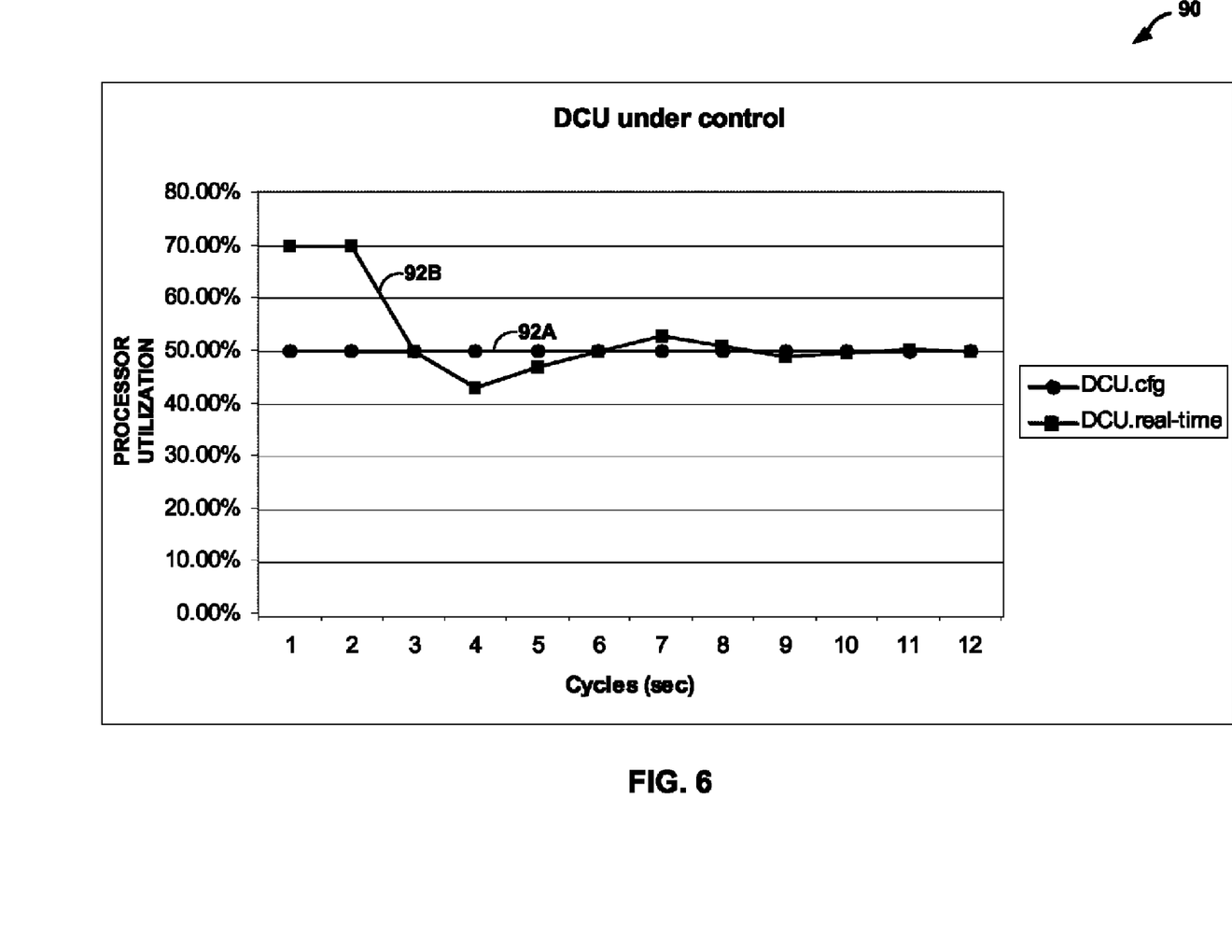
FIG. 6 is a diagram illustrating a graph that depicts convergence of processor utility with configured utility in accordance with the dynamic queue management techniques described herein.

FIG. 6 is a diagram illustrating a graph 90 that depicts convergence of processor utility with relative processing times in accordance with the dynamic queue management techniques described herein. The y-axis of graph 90 provides, as a percentage, a measurement of processor utilization. The x-axis of graph 90 provides a cycle count in terms of seconds ("sec"). Graph 90 also includes two lines 92A and 92B.

Line 92A indicates the configured processor utilization. In other words, line 92A represents graphically relative processor times 64. For ease of illustration purposes, only two queues are assumed to exist with each queue assigned a desirable quota 64 of 50%. Thus, line 92A runs horizontally along the 50% processor utilization time for the duration of the 12 cycles listed at the bottom of the graph.

Line 92B represents the actual processor utility as measured by adjustment module 62 of queue management module 56. At the second cycle, queue management module 56 determines a level of congestion that exceeds congestion threshold 66 and begins adjusting weights 45 to account for the improper utilization of processors 54. That is, prior to the second cycle, processors 54 were allocating nearly 70% to one of the two queues 44 and only 30% to the other of queues 44, which was contrary to relative processor times 64 assigned to each of queues 44 (as both were assigned a relative processor time 64 of 50%). Thus, queue management module 56 adjusted weights 48 to account for the improper processor utilization. Prior to the second cycle, adjustment module 62 of queue management module 56 may not dynamically adjust weights 45 to enable maximum processor utility as described above.

From the second cycle through the twelfth cycle, adjustment module 62 continually adjusts weights 45 to converge the measured processor utility, or line 92B, to the configured processor utility, or line 92A, as defined by desirable quotas 64. Notably, adjustment module 62, in the fourth cycle, adjusts weights 45 such that measured processor utility, or line 92B, swings below the configured processor utility, or line 92A. In later cycles, however, adjustment module 62 readjusts weights 45 such that the swings become less volatile. By the twelfth cycle, adjustment module 62 successfully converges measured processor utility (line 92B) to that of the configured processor utility (line 92A). In this manner, a network device, such as network security device 28, may implement the dynamic queue management techniques to adjust weights assigned to queues based on processor utility and not bandwidth.

Various embodiments of the invention have been described. These and other embodiments are within the scope of the following claims.

The invention claimed is:

1. A method comprising:
   assigning, for each queue of a plurality of queues within a network device, a quota desirable to a user;
   determining, based on the desirable quota assigned to each of the queues, a weight for each of the queues, wherein the weight defines a number of the plurality of packets to be de-queued and processed by a packet processing module executed by the processor during each iteration through the queues;
   processing one or more packets from the plurality of queues with the packet processing module executed by the processor in a round robin manner in accordance with the respective weight assigned to each of the queues;
   computing, for each of the queues, a number of processor clock cycles utilized by the packet processing module during at least one iteration through the queues to dequeue and process the number of the packets in accordance with the weight associated with each of the queues;
   dynamically adjusting, based on the computation, one or more of the queue weights such that subsequent amounts of processing time actually required to process the number of packets defined by each of the queue weights more accurately reflects the desirable quota assigned to each of the queues; and
   outputting with the network device the number of packets in accordance with the adjusted weights.

2. The method of claim 1, further comprising
   applying an open-loop control algorithm when an amount of packets buffered by the queue is below a threshold by forwarding the packets without adjusting the weights; and
   switching to a closed-loop control algorithm that dynamically adjusts the queue weights when the amount of packets buffered by the queues reaches or exceeds the threshold.

3. The method of claim 2,
   wherein the open-loop control algorithm is independent of utilization of the processor, and
   wherein the closed-loop control algorithm is dependent on the utilization of the processor.

4. The method of claim 1, wherein assigning the desirable quota includes:
   receiving via a user interface presented by the network security device, for each queue of the plurality of queues, a percentage that reflects a relative amount of time the processor should consume to service the respective queue; and
   assigning the relative amounts of time to the respective queue of the plurality of queues.

5. The method of claim 1, computing, for each of the queues, the number of cycles includes:
   determining when the packet processing module begins processing the packets stored to one of the plurality of queues in accordance with the corresponding one of the queue weights;
   based on the determination that the packet processing module will begin processing, resetting a cycle count register maintained by the processor;
   determining when the packet processing module ends the processing of the packets stored to one of the plurality of queues; and
   based on the determination that the packet processing module has ended the processing, computing the difference of between a reset value stored to the cycle count register after resetting the register and a current value stored to the cycle count register.

6. The method of claim 5, wherein computing the number of cycles includes storing the computed difference between the reset value and the current value as a cycle count value in a memory of the network security device.

7. The method of claim 1, wherein dynamically adjusting, based on the computation, one or more of the queue weights includes:
   determining a level of congestion based on a current number of packets stored to one or more of the plurality of queues;
   determining whether the level of congestion exceeds a congestion threshold; and
   based on a determination that the level of congestion exceeds the congestion threshold, dynamically adjusting, based on the computation, the one or more of the queue weights such that the subsequent amounts of processing time actually required to process the number of packets defined by each of the queue weights more accurately reflects the desirable quota assigned to each of the queues.

8. The method of claim 7, wherein dynamically adjusting the one or more of the queue weights further includes, based on a determination that the level of congestion does not exceed the congestion threshold, maintaining the current queue weights despite that the subsequent amounts of processing time actually required to process the number of packets defined by each of the queue weights does not accurately reflect the desirable quota assigned to each of the queues.

9. The method of claim 1, wherein dynamically adjusting the one or more of the queue weights includes dynamically adjusting the one or more of the queue weights in accordance with a function used in feedback control systems that dynamically adjusts the queue weight based on the respective desirable quota, a current value of the respective queue weight, and the respective computed number of cycles.

10. The method of claim 9, wherein the function may comprise one of a Proportional-Integral-Derivative (PID) control algorithm, an adaptive PID control algorithm, a linear control algorithm, and a nonlinear control algorithm.

11. The method of claim 1, wherein the processor comprises a multi-core processor that includes a plurality of cores, each core including one or more processors.

12. The method of claim 11,
   wherein the packet processing module comprises a packet processing software thread that is executed by two or more of the processors of the multi-core processor,
   wherein the packet processing thread is associated with the two or more of the processors of the multi-core processor such that the two or more processors collectively execute the packet processing thread.

13. The method of claim 12, wherein the network security device includes a plurality of packet processing nodes, each of the packet processing nodes including a memory to store an instance of the plurality of queues and the multi-core processor that executes an instance of the packet processing thread to process packets stored to each instance of the plurality of queues.

14. A network security device comprising:
a plurality of queues that each store a plurality of packets; and
one or more processors that execute:
a queue management module to assign, for each queue of the plurality of queues, a quota desirable by a user and determine, based on the desirable quota assigned to each of the queues, a weight for each of the queues, wherein the weight defines a number of the plurality of packets to be de-queued and processed by the processor during each iteration through the queues;
a packet processing module that processes one or more packets from the plurality of queues in a round robin manner in accordance with the respective weight assigned to each of the queues,
wherein the queue management module computes, for each of the queues, a number of processor clock cycles utilized by the packet processing module during at least one iteration through the queues to dequeue and process the number of the packets in accordance with the weight associated with each of the queues and dynamically adjusts, based on the computation, one or more of the queue weights such that subsequent amounts of processing time actually required to process the number of packets defined by each of the queue weights more accurately reflects the desirable quota assigned to each of the queues,
wherein the network security device outputs the number of packets in accordance with the adjusted weights.

15. The network security device of claim 14, wherein the queue maintenance module includes an adjustment module that applies an open-loop control algorithm, when an amount of packets buffered by the queue is below a threshold, by forwarding the packets without adjusting the weights, and
wherein the adjustment module switches to a closed-loop control algorithm that dynamically adjusts the queue weights when the amount of packets buffered by the queues reaches or exceeds the threshold.

16. The network security device of claim 15,
wherein the open-loop control algorithm is independent of utilization of the processor, and
wherein the closed-loop control algorithm is dependent on the utilization of the processor.

17. The network security device of claim 14, further comprising a user interface that receives, for each queue of the plurality of queues, the desirable quotas in a manner that reflects a relative amount of time the processor should consume to service the respective queue, wherein the queue management module includes a configuration module that assigns the relative amounts of time to the respective queue of the plurality of queues.

18. The network security device of claim 14, wherein the queue management module includes an adjustment module that computes, for each of the queues, the number of cycles by:
determining when the packet processing module begins processing the packets stored to one of the plurality of queues in accordance with the corresponding one of the queue weights;
based on the determination that the packet processing module will begin processing, resetting a cycle count register maintained by the processor;
determining when the packet processing module ends the processing of the packets stored to one of the plurality of queues; and
based on the determination that the packet processing module has ended the processing, computing the difference of between a reset value stored to the cycle count register after resetting the register and a current value stored to the cycle count register.

19. The network security device of claim 18, wherein the adjustment module computes the number of cycles by storing the computed difference between the reset value and the current value as a cycle count value in a memory of the network security device.

20. The network security device of claim 14, wherein the queue maintenance module includes a congestion module that dynamically adjusts, based on the computation, one or more of the queue weights by:
determining a level of congestion based on a current number of packets stored to one or more of the plurality of queues;
determining whether the level of congestion exceeds a congestion threshold; and
based on a determination that the level of congestion exceeds the congestion threshold, causing an adjustment module of the queue maintenance module to dynamically adjust, based on the computation, the one or more of the queue weights such that the subsequent amounts of processing time actually required to process the number of packets defined by each of the queue weights more accurately reflects the desirable quota assigned to each of the queues.

21. The network security device of claim 20, wherein the adjustment module dynamically adjusts the one or more of the queue weights by further maintaining, based on a determination that the level of congestion does not exceed the congestion threshold, the current queue weights despite that the subsequent amounts of processing time actually required to process the number of packets defined by each of the queue weights does not accurately reflect the desirable quota assigned to each of the queues.

22. The network security device of claim 14, wherein the queue maintenance module includes an adjustment module that dynamically adjusts the one or more of the queue weights by dynamically adjusting the one or more of the queue weights in accordance with a function used in feedback control systems that dynamically adjusts the queue weight based on the respective desirable quota, a current value of the respective queue weight, and the respective computed number of cycles.

23. The network security device of claim 22, wherein the function may comprise one of a Proportional-Integral-Derivative (PID) control algorithm, an adaptive PID control algorithm, a linear control algorithm, and a nonlinear control algorithm.

24. The network security device of claim 14, wherein the processor comprises a multi-core processor that includes a plurality of cores, each core including one or more processors.

25. The network security device of claim 24,
wherein the packet processing module comprises a packet processing software thread that is executed by two or more of the processors of the multi-core processor,
wherein the packet processing thread is associated with the two or more of the processors of the multi-core processor such that the two or more processors collectively execute the packet processing thread.

26. The network security device of claim 25, wherein the network security device includes a plurality of packet processing nodes, each of the packet processing nodes including a memory to store an instance of the plurality of queues and the multi-core processor that executes an instance of the packet processing thread to process packets stored to each instance of the plurality of queues.

27. A computer-readable storage medium encoded with instructions for causing a programmable processor to:
   assign, for each queue of a plurality of queues within a network device, a quota desirable to a user;
   determine, based on the desirable quota assigned to each of the queues, a weight for each of the queues, wherein the weight defines a number of the plurality of packets to be de-queued and processed by a packet processing module executed by the processor during each iteration through the queues;
   process one or more packets from the plurality of queues with the packet processing module executed by the processor in a round robin manner in accordance with the respective weight assigned to each of the queues;
   compute, for each of the queues, a number of processor clock cycles utilized by the packet processing module during at least one iteration through the queues to dequeue and process the number of the packets in accordance with the weight associated with each of the queues;
   dynamically adjust, based on the computation, one or more of the queue weights such that subsequent amounts of processing time actually required to process the number of packets defined by each of the queue weights more accurately reflects the desirable quota assigned to each of the queues; and
   output with the network device the number of packets in accordance with the adjusted weights.

28. The computer-readable storage medium of claim 27, further comprising instructions to cause the programmable processor to:
   apply an open-loop control algorithm when an amount of packets buffered by the queue is below a threshold by forwarding the packets without adjusting the weights; and
   switch to a closed-loop control algorithm that dynamically adjusts the queue weights when the amount of packets buffered by the queues reaches or exceeds the threshold.

29. The computer-readable storage medium of claim 28, wherein the open-loop control algorithm is independent of utilization of the processor, and
   wherein the closed-loop control algorithm is dependent on the utilization of the processor.

* * * * *